(12) United States Patent
Messing et al.

(10) Patent No.: US 11,353,005 B2
(45) Date of Patent: Jun. 7, 2022

(54) REDUCED POWER OPERATION OF A WIND TURBINE

(71) Applicant: Wobben Properties GmbH, Aurich (DE)

(72) Inventors: Ralf Messing, Aurich (DE); Christian Möller, Braunschweig (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/254,690

(22) PCT Filed: Jun. 12, 2019

(86) PCT No.: PCT/EP2019/065320
§ 371 (c)(1),
(2) Date: Dec. 21, 2020

(87) PCT Pub. No.: WO2019/243129
PCT Pub. Date: Dec. 26, 2019

(65) Prior Publication Data
US 2021/0115898 A1     Apr. 22, 2021

(30) Foreign Application Priority Data

Jun. 21, 2018   (DE) ...................... 10 2018 114 935.2

(51) Int. Cl.
*H02J 3/00*       (2006.01)
*F03D 7/02*       (2006.01)
(Continued)

(52) U.S. Cl.
CPC ......... *F03D 7/0284* (2013.01); *F03D 7/0276* (2013.01); *F03D 7/048* (2013.01);
(Continued)

(58) Field of Classification Search
CPC ........ F03D 7/0284; F03D 9/25; F03D 7/0276; F03D 7/048; H02J 3/381; H02J 3/46;
(Continued)

(56) References Cited

U.S. PATENT DOCUMENTS 6,809,431 B1    10/2004  Schippmann
10,612,518 B2 *  4/2020  Niss ...................... F03D 7/0276
(Continued)

FOREIGN PATENT DOCUMENTS

DE          19844258 A1    3/2000
DE       102015203841 A1    9/2016
(Continued)

*Primary Examiner* — Julio C. Gonzalez
(74) *Attorney, Agent, or Firm* — Seed Intellectual Property Law Group LLP

(57) ABSTRACT

A method for operating a wind power installation is provided. The wind power installation comprises an aerodynamic rotor with rotor blades, where the rotor can be operated with a variable rotor rotation speed. The wind power installation outputs an output power generated from wind for feeding into an electrical supply grid. The wind power installation can be operated in a normal operating mode without power reduction and in a reduced operating mode with power reduction, in which a specified power reduced with respect to a rated installation power is specified. When operating in the reduced operating mode for wind speeds above a rated wind speed, at least in one rotation speed increase region, the wind power installation increases its rotor rotation speed as the wind speed rises further.

16 Claims, 4 Drawing Sheets

(51) Int. Cl.
*F03D 9/25* (2016.01)
*F03D 7/04* (2006.01)
*H02J 3/38* (2006.01)
*H02J 3/46* (2006.01)

(52) U.S. Cl.
CPC .............. *F03D 9/25* (2016.05); *H02J 3/381* (2013.01); *H02J 3/46* (2013.01); *F05B 2220/706* (2013.01); *F05B 2270/1033* (2013.01); *F05B 2270/1077* (2020.08); *F05B 2270/3201* (2013.01); *H02J 2300/28* (2020.01)

(58) Field of Classification Search
CPC ............ H02J 2300/28; F05B 2220/706; F05B 2270/1033; F05B 2270/3201; Y02E 10/72
See application file for complete search history.

(56) References Cited

U.S. PATENT DOCUMENTS

| | | |
|---|---|---|
| 2007/0216166 A1* | 9/2007 | Schubert ............... F03D 7/0224 290/55 |
| 2010/0286835 A1 | 11/2010 | Nyborg et al. |
| 2012/0139246 A1 | 6/2012 | Rafoth |
| 2018/0045180 A1* | 2/2018 | Beekmann ............... F03D 7/048 |
| 2018/0051675 A1* | 2/2018 | Kjr ...................... F03D 7/0224 |
| 2019/0390650 A1 | 12/2019 | Harms et al. |

FOREIGN PATENT DOCUMENTS

| | | |
|---|---|---|
| DE | 102016124630 A1 | 6/2018 |
| EP | 2878810 A2 | 6/2015 |
| WO | 2014/026688 A1 | 2/2014 |
| WO | WO-2016139145 A1 * | 9/2016 ............. F03D 7/048 |

* cited by examiner

REDUCED POWER OPERATION OF A WIND TURBINE

BACKGROUND

Technical Field

The present invention relates to a method for operating a wind power installation. The present invention also relates to a wind power installation.

Description of the Related Art

Wind power installations are known, and they generate electric power from wind and usually feed this electric power into an electrical supply grid that is regularly maintained by network operators. Wind power installations are ideally operated in what is known as parallel grid operation in which each wind power installation generates as much power, feeding it into the electrical supply grid, as is possible on the basis of the prevailing wind, giving consideration to technical limits of the wind power installation concerned.

With the increasing number of wind power installations in the electrical supply grid, their influence on the behavior of the electrical supply grid also grows, and in some circumstances can also affect the stability of the electrical supply grid. For this reason inter alia there are also reduced power operating modes. Reduced power operating modes have been developed in order to satisfy the requirements of network operators which for example only request reduced feed power from wind power installations or wind farms when the wind levels are high, in order to prevent overloading the electrical supply grid.

A reduced rated power level can be specified for implementation, in which an associated reduced rated rotation speed can be interpolated from a power-optimized operating mode. A reduced power value which lies below the normal rated power of the wind power installation is thus specified. A rotation speed is to be assigned to this reduced rated power, and this can be understood as a reduced rated rotation speed. This associated rated rotation speed that is thus assigned to this reduced power, i.e., to the reduced rated power level, can be taken from a characteristic rotation speed-power curve that is provided for the partial-load operation of the wind power installation.

Such a characteristic rotation speed-power curve thus represents the relationship between the rotation speed and the power in partial-load operation and with rising rotation speed, a higher power is also assigned, and this concrete assignment indicates the characteristic rotation speed-power curve. In reduced-power operation in which the power is reduced to a value that is lower than the installation could in fact generate at that moment, less power is thus also taken from the wind than would be possible. This can be realized in that the rotor blades are appropriately turned out of the wind, so that the aerodynamic rotor takes less power from the wind than would be possible at that moment. From the point of view of the generator, this corresponds to a situation in which correspondingly lower wind is in fact present. It is accordingly obvious that in the case of an artificial power reduction, the same rotation speed-power value is to be set as in the case of a prevailing wind that leads to the same power value.

While the same operating point does result from the point of view of the generator, it has however been found that this artificial reduction has the consequence that reduced power operating modes always have significantly lower rated rotation speeds than the power-optimized mode. The rotation speeds, at any rate in rated operation when the respective power limit is achieved, are thus lower with the same prevailing wind in the reduced-power operating mode than in the normal, that is to say power-optimized operating mode.

In principle, the rated power is reached at what is known as a rated wind speed. If this rated power is reduced in the reduced operating mode, a reduced rated wind speed is also to be assumed for the reduced-power operating mode, since the reduced rated power is already reached at lower wind speeds. At wind speeds above the rated wind speed, regardless of whether this is the normal or the reduced, the wind power installation regulates itself to the corresponding rated rotation speed by adjusting the rotor blades, which is also generally referred to as pitching the rotor blades, independently of the wind speed, at least provided storm operation is not in action.

In this rated operation as it is known, or full-load operation, the regulation does not take the wind speed into consideration, but simply performs a regulation that regulates the installation to rated power and rated rotation speed. Thus if, for example, the wind speed increases in this operating mode it is possible—put simply—to briefly increase the rotation speed and the power somewhat, something countered by the regulation equipment, namely in particular by pitching the rotor blades. Provided the generator torque remains constant because, for example, in the case of an externally excited synchronous generator, the excitation remains unchanged, regulation to a constant rated rotation speed in principle also necessarily leads to a constant power, namely usually the rated power.

In a storm operating mode, which can initiate above a predefined wind speed, the wind power installation regulates to a rotation speed that depends on the wind speed; in storm operating mode, this can fall from the rated rotation speed down to a spin rotation speed.

As a result, particularly in this rated operating mode or full-load operating mode, the wind power installation is then operated with different rotation speeds at the same wind speeds. The effect also in particular occurs in which the rotation speed, and thereby the circulation speed in reduced-power operation, are less than in optimal-power operation. This in turn means that the tip speed ratio $\lambda$ that indicates the ratio of the circulation speed of the aerodynamic rotor at its blade tip to the wind speed, falls with increasing wind speed and is thus lower in reduced-power operation than in optimum-power operation.

It has been recognized that at high wind speeds and the corresponding blade angles such low tip speed ratios can lead to stalling on the rear side of the rotor blade profile. It can be particularly problematic here that such stalls only occur at a few positions along the full length of the rotor blade. This can in turn lead to increased torsion stresses.

Because such stalls only occur in partial regions, the wind power installation continues however to be driven by the wind, so that the aerodynamic rotor continues to turn and continues to be exposed to stresses.

The problem of low tip speed ratios at high wind speeds occurs in particular at the transition region to storm operation. This is because it is precisely then that a relatively low tip speed ratio is present while the mechanical stress from the high wind is at the same time high, whereas a reduction in the operation of the wind power installation to protect against storm has not yet been performed.

In the priority application for the present application, the German Patent and Trademark Office has researched the following prior art: DE 198 44 258 A1, DE 10 2015 203 841 A1, DE 10 2016 124 630 A1 and US 2012/0139246 A1.

BRIEF SUMMARY

As described herein, torsional oscillations in reduced-power operation are avoided as much as possible.

A method for operating a wind power installation is proposed. A wind power installation that comprises an aerodynamic rotor with rotor blades—three rotor blades are in particular proposed—is accordingly assumed. This aerodynamic rotor, or the wind power installation as a whole, can be operated with a variable rotor rotation speed. When operating, the wind power installation outputs an output power generated from wind for feeding into an electrical supply grid. It is moreover provided that the wind power installation can be operated in a normal operating mode without power reduction and in a reduced operating mode with power reduction. A specification for a power reduction can in particular be requested from an external source, in particular from a network operator who operates the electrical supply grid.

To this end it is now proposed that when operating in the reduced operating mode for wind speeds above a rated wind speed at least in one rotation speed increase region, the wind power installation increases its rotor rotation speed as the wind speed rises further, while the power still remains reduced.

It is thus the reduced operating mode that is under specific consideration here, and it is assumed that the normal operating mode preferably operates in the known manner. In the reduced operating mode, a reduced power value is specified by the power reduction, and this can also be referred to as the reduced specified power. This reduced specified power lies below a normal rated power of the wind power installation, i.e., below a non-reduced rated power that can also be referred to as the rated installation power.

The wind power installations initially operates in such a way that in partial-load operation, as the wind speed rises, it increases its power and rotation speed together with the rising wind speed. This increase in power and rotation speed is continued until the power has reached the specified limit value, i.e., until the installation power has reached the defined reduced specified power. Until now, the power and the rotation speed have been held at this value, which can thus also be referred to as the reduced rated rotation speed or as the reduced specified power.

Now however it is proposed that as the wind speed continues to rise, the rotation speed is also further to be increased, that is to say above this reduced rated rotation speed. The output power of the wind power installation can here be reduced in another manner, or it is possible to prevent it from rising again in another manner. It is in particular appropriate to consider here that an excitation of the generator is reduced, i.e., a generator torque is reduced, so that in spite of the continued increase in the rotation speed, the power, i.e., the output power of the wind power installation, is not increased. This increase in rotation speed does not, however, have to take place immediately, but it may be only appropriate to propose it after a further rise in the wind speed.

The rotor rotation speed is at least further increased in a rotation speed increase region above the rated wind speed as the wind speed increases. The rated wind speed can in particular also be a reduced rated wind speed, namely the speed at which the output power reaches the value of the reduced specified power when the usual characteristic rotation speed-power curve is taken as a basis. The reduced rated wind speed is thus related to the reduced operating mode. A rated wind speed is namely often related to the operating mode in use at the time, and refers to the wind speed at which the maximum power of the operating range concerned is reached. It is therefore also relevant to consider the fact that the increase in the rotor rotation speed as the wind continues to rise is only carried out above the normal rated wind speed, i.e., above the wind speed at which the output power reaches the normal rated power of the wind power installation when the normal characteristic rotation speed-power curve is taken as a basis.

It has been recognized that the stress on the wind power installation, in particular on the rotor blades, can surprisingly be reduced in that the rotation speed is further increased in spite of the power limitation. In this way it is possible to ensure that the tip speed ratio is higher in comparison with a characteristic operating curve with which the rotation speed would not be further increased. Stalling on the rear side of the rotor blade profile can be avoided with this, and in particular, stalling occurring only locally can be avoided, whereby in turn torsional stresses and associated torsional oscillations of the rotor blade, can be avoided. Altogether this then leads to a lower stress in comparison with an operating mode in which such local stalling, and corresponding torsional stresses and torsional oscillations, would occur. The stalling on the rear side can also have the consequence of greatly increased noise emissions from the wind power installation. The increase in rotation speed and the associated avoidance of the stalling also prevents an increased noise emission as a result of stalling noise at the installation. Here again, the surprising effect appears that an increase in the rotation speed leads to a reduction in the noise, at least opposes a further increase in the noise.

Preferably the rotation speed in the reduced-power operating mode is increased with the rising wind speed up to a maximum of the normal rated rotation speed, i.e., the non-reduced rated rotation speed. It has been recognized that at first a further increase in the rotation speed as a result of the described effect of avoiding a local stall can initially have the result of an altogether reduced stress, which is of greater value than a small increase in stress due to a higher rotation speed. It has also however been recognized that an increase in the rotation speed cannot be carried out without limit, and the normal, non-reduced rated rotation speed is a good value that if possible should not be exceeded. It should also be borne in mind here that a normal rated rotation speed is often significantly higher than a reduced rated rotation speed. It is preferably proposed that the increase in the rotor rotation speed in the reduced operating mode is carried out at values above the normal rated rotation speed. The rotor rotation speed here can be increased not only up to values of the rated rotation speed, but, at least in one section, also increased to values above that. The rotation speed is accordingly increased above the rated rotation speed in spite of the reduced power. It has namely been recognized that a reduction in the stress can be achieved precisely through increasing above the rated rotation speed.

According to one form of embodiment, it is proposed that depending on the prevailing wind speed, the wind power installation is operated in a partial-load operation, a full-load operation or a storm operation. The wind power installation thus has these modes of operation, and they are each assigned to a wind speed range. The concrete selection of the respective type of operation can be done depending on an ascertained wind speed, but can also however take place depending on state variables.

In partial-load operation, the wind speed lies below a rated wind speed, so that a maximum power that can be generated cannot be achieved. The output power then thus depends on the wind speed, and the wind power installation is in particular operated in such a way that the output power is as large as possible.

In full-load operation, the wind speed lies at or above the rated wind speed but below a storm wind speed, so that the maximum power that can be generated is generated. The maximum power that can be generated can be referred to as the rated power. To better distinguish between the normal operating mode on the one hand and the reduced operating mode on the other hand, a distinction is made between a rated installation power and a reduced specified power. The rated installation power is in this respect the normal rated power for which the wind power installation is designed. The reduced specified power can also be thought of as the reduced rated power, as it also refers to a power that fundamentally should not be exceeded but which, however, can be located and specified below the rated installation power. It is thus not determined by the design of the wind power installation, but can be specified in the course of operation, particularly by a network operator.

In storm operation, the wind speed lies at or above the initial storm wind speed, and less than the maximum power is generated in order to protect the wind power installation, i.e., at least less than the normal rated power, i.e., at least less than the rated installation power. This serves to protect the wind power installation, and the initial storm wind speed can here be specified as a fixed value, and identifies a wind speed above which storm operation is to be assumed for the wind power installation concerned, and the wind power installation is operated appropriately. The storm wind speed is to this extent a general concept that describes wind speeds in storm operation, i.e., the initial storm wind speed and the wind speeds lying above that. A wind speed lying below the storm wind speed thus also lies below the initial storm wind speed.

The following is now proposed for the rotor rotation speed of the wind power installation in the reduced operating mode and also in full-load operation. For wind speeds above the rated wind speed up to an escalation wind speed which lies above the rated wind speed and below the initial storm wind speed, the wind power installation holds its rotor rotation speed constant at a reduced rated rotation speed. For wind speeds above the escalation wind speed, the wind power installation increases its rotor rotation speed. The increase in particular takes place in such a way that it is increased continuously as the wind speed rises further, in particular linearly, up to the initial storm wind speed, or that it is increased continuously as the wind speed rises further up to a normal rated rotation speed.

An escalation wind speed is thus specified, and this generally lies within full-load operation. It is thus higher than a rated wind speed and lower than an initial storm wind speed. It is accordingly in particular proposed that the rotor rotation speed in reduced operating mode is not initially further increased above a rated wind speed until, however, the wind speed has reached the value of the escalation wind speed. The rotor rotation speed is then increased as the wind speed rises further. It is in particular recognized here that initially, i.e., at comparatively low wind speeds in full-load operation, an increase in the rotation speed in reduced operating mode is not initially required, as problems due to low tip speed ratios are not to be expected at first. Only later, when the wind speed has risen further, can the described phenomena of stalling at low tip speed ratios occur. An escalation wind speed of this sort is accordingly defined. It can in particular lie somewhat below a wind speed at which the said problems can otherwise occur as a result of a low tip speed ratio.

The way in which the rotor rotation speed is increased above the escalation wind speed can vary, and two variants in particular are proposed here. According to the first variant, the rotor rotation speed is in particular increased starting from the escalation wind speed as the wind speed continues to rise up to the initial storm wind speed. A storm is then namely occurring, and the wind power installation is then to be reduced further in its operation in such a way that installation stresses are not exceeded. In principle such a wind-speed-dependent curve of the rotor rotation speed can then reach the curve of the rotor rotation speed in normal operating mode.

According to the second proposed variant, the rotor rotation speed is increased above the escalation wind speed up to a normal rated rotation speed. In other words, the rotor rotation speed is increased in reduced operating mode above the escalation wind speed until it reaches the characteristic wind speed rotation speed curve or the wind-speed-dependent rotation speed curve of the normal operating mode. From this moment or this state on, the further operational control at least of the rotor rotation speed as the wind speed continues to rise can be the same in reduced operating mode as it is in normal operating mode.

In principle, these two alternatives can also match one another if, namely, the rotor rotation speed reaches the normal rated rotation speed precisely at the initial storm wind speed.

It is in particular recognized here that a lower rotor rotation speed can initially be appropriate in reduced operating mode, but that it is to be increased above a certain wind speed in order to avoid the said problems of a tip speed ratio that is too low. The further increase is carried out here in such a way that the wind-speed-dependent curve of the rotor rotation speed in reduced operating mode reaches the rotor rotation speed curve of the normal operating mode as the wind speed rises further. From that point on the rotor rotation speeds can be controlled in the same manner in both operating modes.

According to one form of embodiment, it is proposed that in the reduced operating mode, the output power and/or the rotor rotation speed in the partial-load operation is set depending on a predefined characteristic curve, in particular a characteristic rotation speed-power curve, until the output power has reached the value of the reduced specified power. To that extent, the same operational control can in principle be used as a basis as in a normal operating mode. In particular, the output power is set depending on the characteristic rotation speed-power curve. In particular this takes place in such a way that the output power is set according to the characteristic rotation speed-power curve depending on an ascertained rotor rotation speed. The rotor blade angle here is preferably constant, namely in particular constant in the whole of the partial-load operation. If the rotor rotation speed remains constant at the set output power, a stable operating point has developed. If, however, it does not remain constant, and, for instance, increases, the output power correspondingly also continues to change, in the said example thus increases, but could also be reduced. As a result, the generator torque or the counter-torque also rises or falls, so that in this way a stable working point will be found through continuously adjusting the output power according to the characteristic rotation speed-power curve.

In this way the output power is set, and the rotor rotation speed results. The rotation speed is thus however also set indirectly, depending on the characteristic rotation speed-power curve. Depending on the way in which this is considered, both the output power and the rotor rotation speed are thus set depending on the characteristic rotation speed-power curve. Instead of the output power, a generator torque can also, moreover, be set in a similar manner. It is to be noted here that the rotation speed n, with the torque M and the power P are interrelated in the steady-state by the equation $P=M*n$.

It is now further proposed that in the reduced operating mode, as the wind speed continues to rise, in particular in the full-load operation, the output power is regulated to the value of the reduced specified power and at the same time the rotor rotation speed is set depending on an ascertained, in particular a measured, wind speed, in particular on the basis of a characteristic wind speed-rotation speed curve. It is thus proposed here that the regulation concept is fundamentally changed. A change is namely made from control of power and rotation speed depending on the characteristic rotation speed-power curve, to two essentially independent regulation or control branches. The output power is thus merely regulated to a constant value, independently of how great the wind speed is. It is also proposed that a characteristic wind speed-rotation speed curve is used for the rotation speed, which is to that extent a control of the rotor rotation speed, at least a setpoint value for the rotor rotation speed is controlled or specified. The implementation of such a setpoint value for the rotor rotation speed can then, however, still be carried out by means of a regulation.

It is also here noted in particular that fundamentally a regulation or control of the wind power installation depending on an ascertained, namely in particular on a measured, wind speed is fundamentally undesirable, since the ascertainment of a wind speed is usually subject to great inaccuracies. It is however also recognized in this connection, that the rotor rotation speed, which here is set depending on the wind speed, can tolerate slight deviations from the specified characteristic wind speed-rotation speed curve, since it represents an improvement over the reduced rotor rotation speed used here so far, and at least most of the time still lies below a non-reduced rated rotation speed. In addition, due to the decoupled control or regulation of the rotation speed and the power, the regulation of the power continues to be carried out independently of the ascertained wind speed.

It is further proposed that in the reduced operating mode, with a further rise in wind speed from or above the initial storm wind speed, the output power and the rotor rotation speed is set depending on the ascertained, in particular measured, wind speed. This setting takes place in particular on the basis of a respective characteristic curve for each of these two variables. For the storm operation, yet another regulation concept is thus proposed, in accordance with which namely both the rotation speed as well as the power are each set depending on an ascertained wind speed. Here again of course, the implementation of such a setting can take place by means of a regulation.

According to one form of embodiment, it is proposed that the increase in the rotor rotation speed in the reduced operating mode is carried out above the rated rotation speed depending on a variable representative for a stress on the rotor blades, in particular depending on an ascertained oscillation of at least one of the rotor blades, in particular a torsional oscillation. Such an oscillation can thereby be counteracted immediately. It is to be noted here that increasing the rotation speed when oscillations of the rotor blades arise is usually regarded as exceptional, since an increase in rotation speed generally leads to an increase in stress. Here, however, it is recognized that an increase in the rotation speed leads to an increase in the tip speed ratio, and that torsional oscillations can be avoided in the operating mode.

It is thus proposed that the increase in the rotor rotation speed is also carried out quantitatively depending on the stress or on a variable representative thereof. A stress-dependent rotation speed regulation is particularly to be considered here.

In addition or as an alternative it is proposed that the increase in the rotor rotation speed in the reduced operating mode is carried out above the rated rotation speed as soon as the variable that is representative of a stress on the rotor blades, or the ascertained oscillation, of at least one of the rotor blades exceeds a predefined stress threshold. Stresses can thus be recorded here and a threshold value specified which, when exceeded, leads to a reaction, namely increasing the rotor rotation speed. The two alternatives that have been given can also be combined, namely in that said stress initiates both an increase in the rotor rotation speed and that this stress also quantitatively leads to the increase in the rotor rotation speed.

According to one form of embodiment, it is proposed that the normal operating mode is based on a normal characteristic rotation speed curve that depends on the wind speed. This normal characteristic rotation speed curve basically describes the rotation speed value depending on the wind speed. This does not have to mean that the rotation speed is controlled entirely on the basis of this normal characteristic rotation speed curve in such a way that it is always set depending on an ascertained wind speed. This normal characteristic rotation speed curve initially provides the basis for design, is thus used for the design of the wind power installation, and can, possibly in sections, particularly in storm operation, also however actually be used for adjusting the rotation speed.

The reduced operating mode is furthermore based on a reduced characteristic rotation speed curve that depends on the wind speed. This too describes the curve of the rotation speed depending on the wind speed, but in this case for the reduced operating mode. Here again, however, this does not have to mean that the rotor rotation speed depends on this characteristic rotation speed curve in every part of the range, i.e., is set depending on the wind speed, although this can however at least partially be the case.

For the reduced characteristic rotation speed curve, it is proposed that in full-load operation up to a unification wind speed it has lower rotation speed values than the normal characteristic rotation speed curve at the same wind speed values, and that the reduced characteristic rotation speed curve partially or fully matches the normal characteristic rotation speed curve for further rising wind speed above the unification wind speed. It is in addition or alternatively provided that the reduced characteristic rotation speed curve has higher rotation speeds, at least in sections, than the normal characteristic rotation speed curve. In particular it can be provided here that the reduced characteristic rotation speed curve intersects the normal characteristic rotation speed curve at the unification wind speed, and then initially has higher values with further rising wind speed. At the latest at wind speed values at which, in normal operating mode in storm operation, the output power reaches the reduced specified power, the two characteristic rotation speed curves can match.

It is particularly recognized here that at the unification wind speed, the two characteristic rotation speed curves, while they do have the same rotation speed, however have different powers; accordingly a different blade pitch angle is also present and therefore less favorable flow conditions can be present at the rotor blade for the reduced operating mode in spite of the rotation speed being the same.

As a precaution it is to be pointed out that the reduced characteristic rotation speed curve refers to the characteristic rotation speed curve that is assigned to the reduced operating mode. It does not also in every case have to have a lower rotation speed than the normal characteristic rotation speed curve.

Preferably it is proposed that in the reduced operating mode, the rotor rotation speed is lower at the rated wind speed than at the initial storm wind speed, and/or that the unification wind speed corresponds to the initial storm wind speed, or lies below it. It is thus in particular proposed that the rotor rotation speed of the reduced operating mode in full-load operation nevertheless rises to the initial storm wind speed. It is also to be noted that a rise in the rotation speed usually only takes place in partial-load operation up to full-load operation, and the rotation speed in full-load operation is not increased further to avoid stresses. It is now proposed here that in full-load operation the rotor rotation speed is nevertheless increased further, and that a stress reduction is thereby achieved. The increase is proposed here even in the direction of storm operation, although it is precisely in storm operation that it is generally expected that a reduction in rotation speed will reduce the stresses.

According to one form of embodiment it is proposed that a rotation speed curve that depends on the wind speed in partial load operation is specified which is the same in the normal operating mode and in the reduced operating mode, until the output power reaches the reduced specified power. It is furthermore proposed here that the value of the rotor rotation speed that develops when the output power has reached the reduced specified power forms a reduced rated rotation speed, wherein at the same time a reduced rated wind speed is present. The reduced rated rotation speed lies here below an installation rated rotation speed, and the reduced rated wind speed lies below an installation rated wind speed. It is furthermore proposed to this end that in the reduced operating mode, as the wind speed rises further up to the escalation wind speed, the rotor blades are adjusted in such a way that the output power is not increased further. It is in particular proposed that the output power retains the value of the reduced specified power, and the rotor rotation speed is held at the value of the reduced rated rotation speed.

It has accordingly been recognized that for the reduced operating mode, the same key parameters can systematically be taken as a basis as for the normal operating mode. A rotor rotation speed increase is proposed for the reduced operating mode, but it is proposed that the rotor rotation speed is initially held at the value of the reduced rated rotation speed and that it is only increased starting from the escalation wind speed. In the reduced operating mode, the rotor rotation speed can initially be comparatively low and can also be retained, particularly at the start of full-load operation, and then increased when this is expedient for reduction of said torsional stresses for the reasons that have been given.

Preferably it is proposed that the escalation wind speed lies at least 10% above the rated wind speed, in particular 10% above the rated wind speed of the normal operating mode, i.e., 10% above the rated installation wind speed. It is furthermore proposed that the escalation wind speed here lies at least 10% below the initial storm wind speed. A significant range is thus provided in which the rotor rotation speed can be increased from the escalation wind speed up to the initial storm wind speed, whereas it is at the same time proposed that an increase does not occur immediately starting at the rated rotation speed, but only at a significantly higher value of the wind speed.

According to a further form of embodiment it is proposed that the rotor rotation speed and the output power in the partial-load operation are controlled depending on a characteristic rotation speed-power curve, wherein the same characteristic rotation speed-power curve is used for the normal operating mode and the reduced operating mode up to the reduced specified power and/or up to the reduced rated power. It is further proposed in this respect that the rotor rotation speed and the output power are reduced as the wind speed increases above a wind speed that is greater than the second storm wind speed that is greater than the initial storm wind speed. A characteristic rotation speed curve that depends on the wind speed is specified here for the reduction of the rotor rotation speed, and a characteristic power curve is specified for the reduction of the output power. The same characteristic rotation speed curve and the same characteristic power curve are used here for the normal operating mode and the reduced operating mode for wind speeds above the second storm wind speed.

In particular it is proposed that different characteristic power curves are used for the region from the initial storm wind speed up to the second storm wind speed for the normal operating mode and the reduced operating mode. The characteristic rotation speed curves are preferably, however, the same in this region, at least being the same in segments.

Here again it has been recognized that the normal operating mode and the reduced operating mode can be operated identically from the second storm wind speed.

A wind power installation is also proposed. This comprises:
  an electric generator for generating electric power;
  an aerodynamic rotor with rotor blades for generating a mechanical power from wind for driving the generator, wherein the rotor can be operated with variable rotor rotation speed;
  a feed apparatus in order to feed an output power generated from wind into an electrical supply grid at a grid connection point;
  a switching apparatus for switching an operation of the wind power installation between a normal operating mode without power reduction and a reduced operating mode with power reduction, wherein in the reduced operating mode a specified power reduced with respect to a rated installation power is specified; and
  a control apparatus that is configured to control the wind power installation in such a way that when operating in the reduced operating mode, and for wind speeds above a rated wind speed, at least in a rotation speed increase region, the rotor rotation speed is increased as the wind speed rises further.

A wind power installation is in particular thus proposed that has corresponding apparatus in order to carry out at least one method for the operation of a wind power installation according to one form of embodiment described above.

The electric generator can be designed for this purpose preferably as an externally excited or constantly excited synchronous generator. A gearless wind power installation is preferably proposed in which the aerodynamic rotor is directly mechanically linked to an electrodynamic rotor or to the armature of the generator.

The feed apparatus is preferably designed as an inverter or inverter arrangement with a plurality of inverters. This can obtain its power from the generator, either via a rectifier that delivers a direct current or direct voltage which the inverter then converts into an alternating current that can be fed in. It may also, however, be considered that the feed apparatus is designed as a full rectifier, in particular as what is known as a back-to-back converter that generates an alternating current on one side and receives an alternating current for a generator on another side and which can also at least partially control the generator with this other side, namely in particular can control a multiphase stator current of the generator.

The switching apparatus for switching an operation of the wind power installation between the normal operating mode and reduced operating mode can preferably be provided in a process computer and be implemented there, namely for example programmed, for example as a control apparatus.

The control apparatus can also be constructed in the same process computer or in a further process computer, and thereby implement the control steps described through this process computer. The control apparatus is in particular connected to a feed apparatus in such a way that it gives control signals to the feed apparatus. The control apparatus can also be configured to give signals to the switching apparatus. It may also be considered that the control apparatus is preferably connected to a measuring device, in particular to measuring device for ascertaining the wind speed (anemometer), a rotor rotation speed and/or an output power (power meter) of the wind power installation.

It is also possible that the switching apparatus is part of the control apparatus.

Preferably the wind power installation is configured to implement at least one method for operating a wind power installation according to one of the forms of embodiment described above, in that it is performed entirely or partially by means of the control apparatus. In particular the control apparatus is thus configured to implement at least one of the methods described above for the operation of a wind power installation.

A wind farm is also proposed comprising a plurality of wind power installations according to at least one form of embodiment of the wind power installations described above. The wind farm can in particular comprise a central farm controller in order in each case to specify a reduced specified power to the wind power installations, in particular depending on a total power reduction for the wind farm received from outside. Through this, a grid operator in particular can transmit a total power reduction as a specification to the wind farm, for example as a corresponding demand signal. This can take place directly at the farm controller. The wind farm then converts this received total power reduction into individual power reductions for the individual wind power installations. This can take place through concrete values, or can also be done as a percentage. Preferably the central farm controller ascertains for this purpose the power actually being fed into the electrical supply grid, or the total of all the output powers of the wind power installation of the wind farm, and depending thereon can recognize whether the total power reduction received from outside has or has not been reached and then, if relevant, adjust the reduced specified powers to the wind power installations. This too can be done as absolute values or by means of a percentage value which, for example, states a percentage value for each wind power installation related to their rated installation power.

BRIEF DESCRIPTION OF THE SEVERAL VIEWS OF THE DRAWINGS

The invention will now be explained by way of example in more detail below with reference to forms of embodiment and with reference to the accompanying figures.

DETAILED DESCRIPTION

Figure 1:
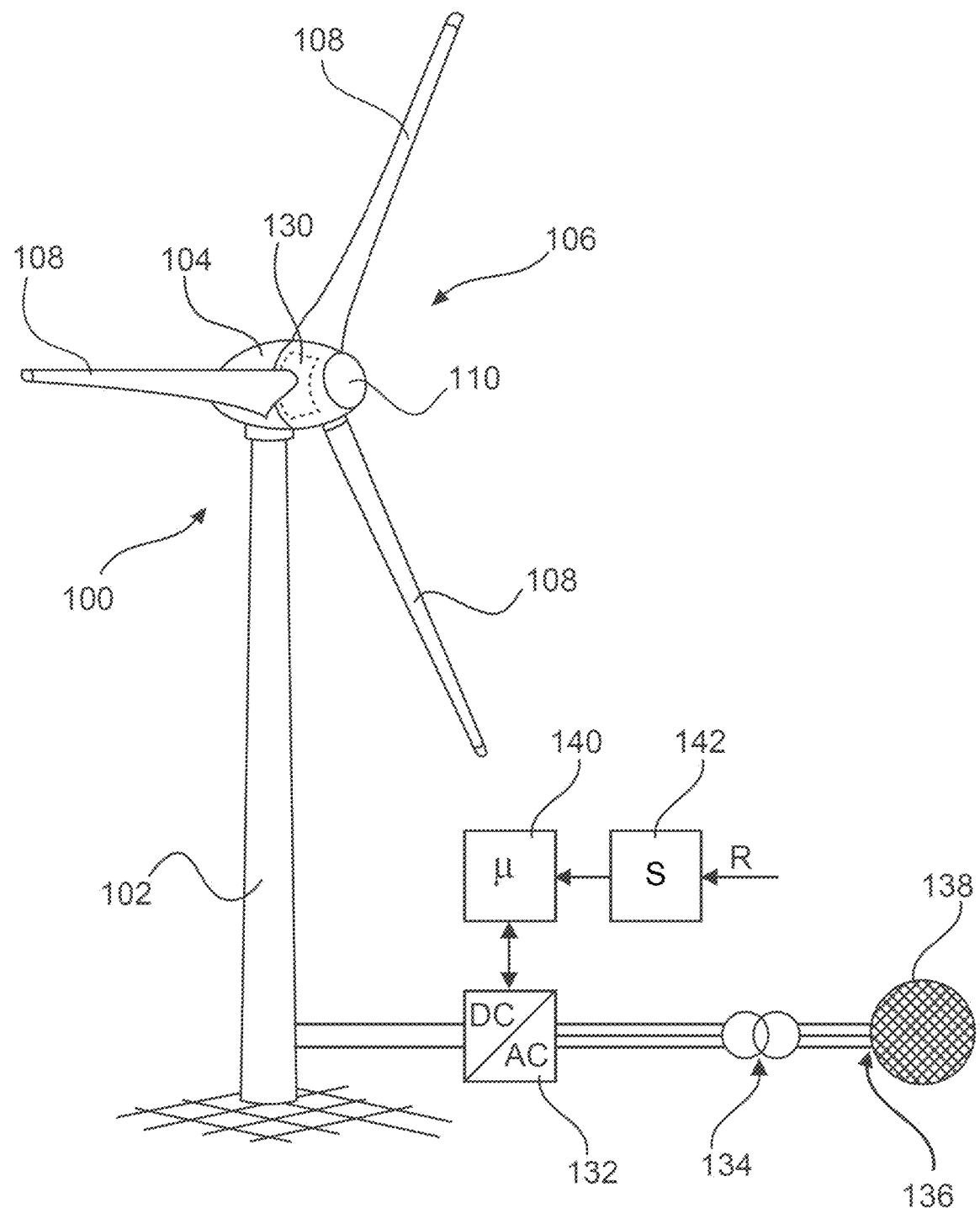
FIG. 1 shows a perspective view of a wind power installation.

FIG. 1 shows a wind power installation 100 with a tower 102 and a nacelle 104. A rotor 106 with three rotor blades 108 and a spinner 110 is arranged at the nacelle 104. The rotor 106 when operating is set into rotary movement by the wind, thereby driving a generator in the nacelle 104.

In FIG. 1, a generator 130 that generates electric power and transfers it to an inverter 132 is moreover indicated in the nacelle 104, wherein alternating current previously generated by the generator was rectified. The inverter 132 feeds into the electrical supply grid 138 via a transformer 134 at a grid connection point 136.

A control apparatus (controller) 140 that operates the inverter 132, which forms a feed apparatus, is provided for control of the inverter 132. For a reduced-power operating mode, a reduction signal R can be supplied to a switching apparatus (processor, computer or controller) 142. The switching apparatus 142, which can also be part of the control apparatus 140, then initiates a change from normal operating mode into the reduced operating mode.

Figure 2:
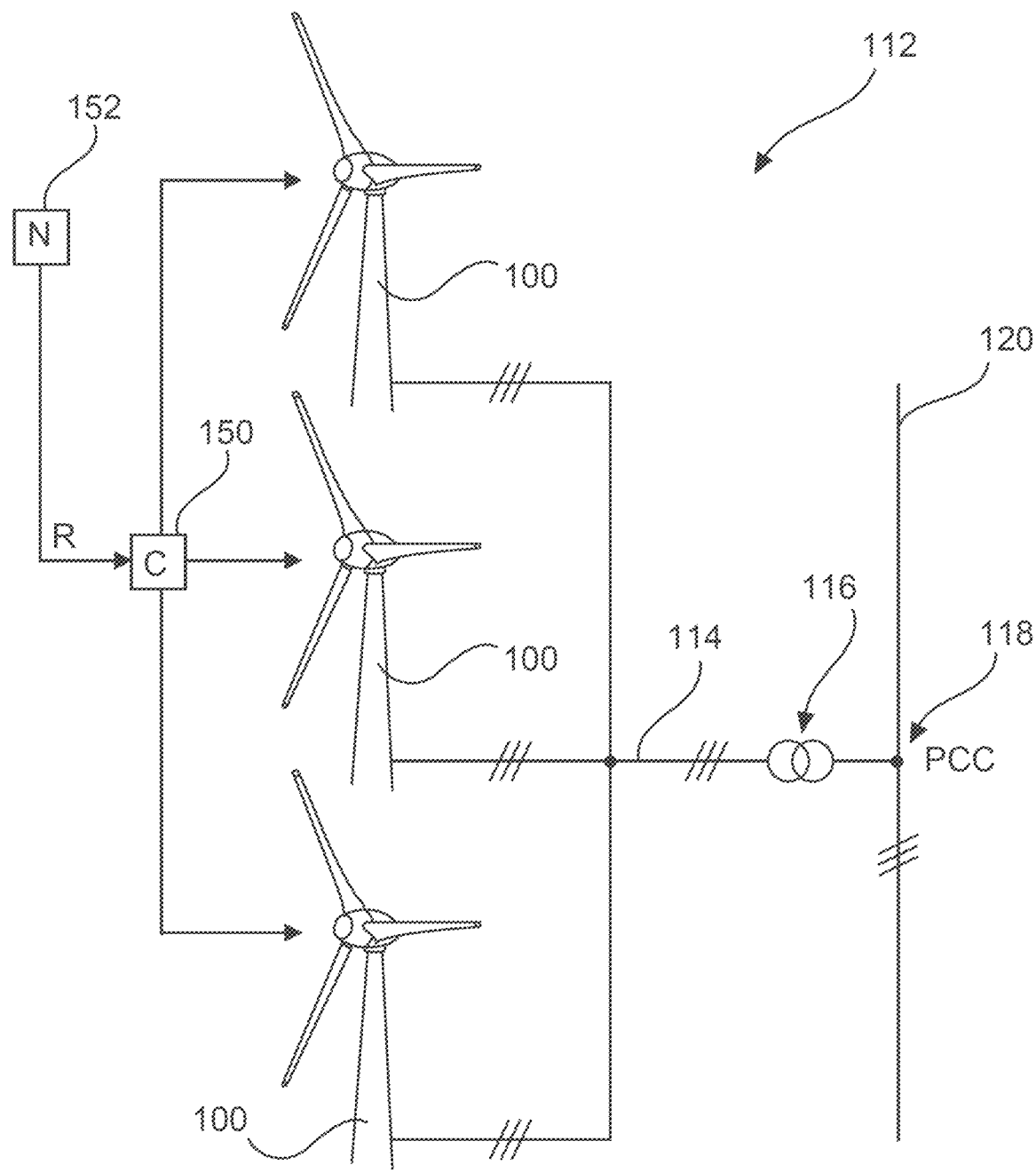
FIG. 2 shows a schematic representation of a wind farm.

FIG. 2 shows a wind farm 112 with, by way of example, three wind power installations 100, which can be the same or different. The three wind power installations 100 are thus representative of what in principle is an arbitrary number of wind power installations of a wind farm 112. The wind power installations 100 make their power, namely in particular the current generated, available via an electrical farm grid 114. The currents or powers generated by each of the individual wind power installations 100 are added together, and a transformer 116 that steps up the voltage in the farm is usually provided in order to then feed it into the supply grid 120 at the feed point 118, which is also generally referred to as the PCC. FIG. 2 is merely a simplified illustration of a wind farm 112 which, for example, does not show a controller, although of course a controller is present. The farm grid 114 can, for example, also be configured differently in that, for example, a transformer is also present at the output of each wind power installation 100, to mention just one other exemplary embodiment.

The wind farm 112 of FIG. 2 can also comprise a central park controller 150. This central park controller 150 can receive a power reduction signal R from a network operator 152, and thus from outside. The central park controller 150 can, on the basis of this reduction signal R, output individual values or percentage values for the power reduction of the individual wind power installations 100.

Figure 3:
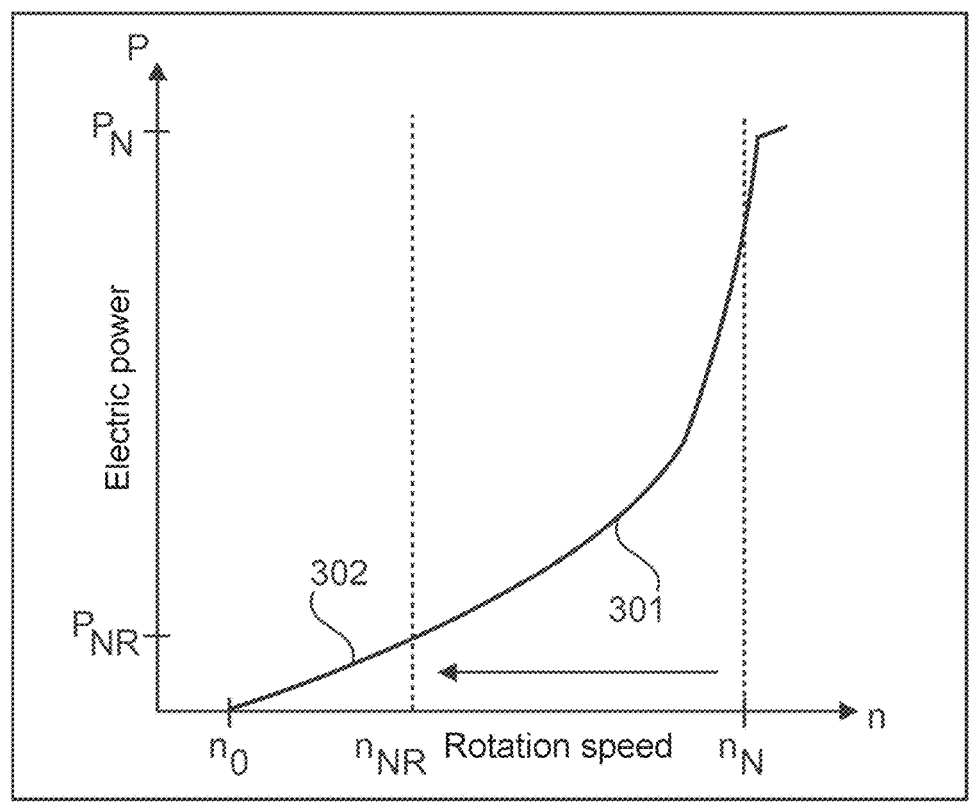
FIG. 3 schematically shows a diagram with two characteristic operating curves, namely for a power-optimized operation and for a reduced power operation.

FIG. 3 schematically shows two characteristic operating curves, namely what are known as characteristic rotation speed-power curves. The first of these characteristic rotation speed-power curves 301 concerns a normal operating mode, namely what is known as a power-optimized characteristic operating curve. In this case the operation of the installation is optimized, and correspondingly the characteristic rotation speed-power curve 301 configured optimally and also matched to the rotor blade and the correspondingly chosen blade angle. Above a starting rotation speed $n_0$ the power P rises with increasing rotation speed up to the rated rotation speed $n_N$, and then also reaches the rated power $P_N$, namely the rated installation power.

A reduced-power characteristic operating curve 302 at least initially matches the first characteristic operating curve, that is the first characteristic rotation speed-power curve 301, until it has reached the reduced rated rotation speed $n_{NR}$ and the reduced rated power $P_{NR}$. The reduced specified power, which corresponds to this reduced rated power $P_{NR}$, is then reached, and the output power must not be increased further. At the same time the rotor rotation speed n is frozen, so to speak, at this low rotation speed value. The rotor rotation speed n thus then has this reduced rated power rotation speed value $n_{NR}$ and retains it.

Figure 4:
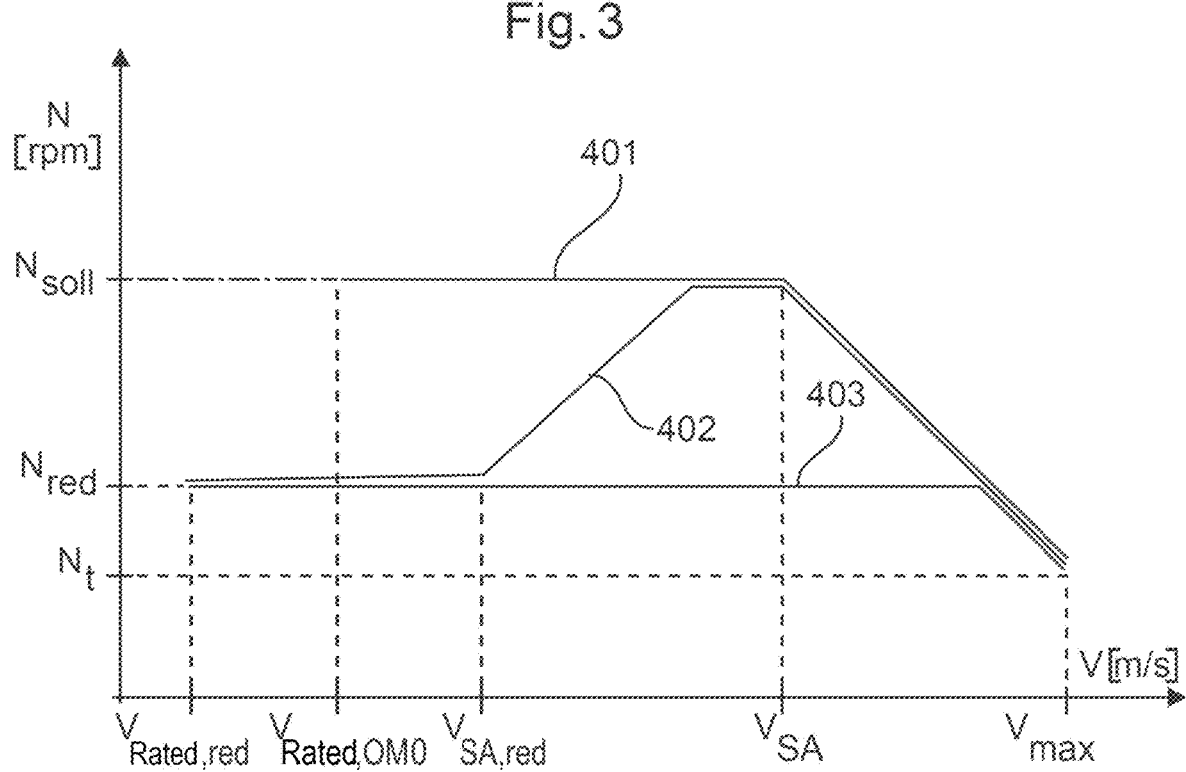
FIG. 4 shows a simplified diagram that displays a relationship between rotation speed curves and the wind speed under full load and storm.

According to one form of embodiment, FIG. 4 shows a curve of a rotor rotation speed for three operating cases, namely a power-optimized curve 401, a reduced-power, improved curve 402, and a reduced-power curve 403 that has not been improved.

Operation of the installation above the rated wind speed is thus to be illustrated with the aid of FIG. 4. FIG. 4 shows the relationship between the rotation speed and the wind speed in the operating range of the installation in the full-load range of the respective operating mode, i.e., for wind speeds above the rated wind speed applicable to the respective operating mode. The partial load operation until the rotated rotation speed is reached is not illustrated, for reasons of improved clarity.

The power optimized curve 401 thus shows the power-optimized operating mode OM0. Above the rated wind speed $V_{Rated,OM0}$ the installation is regulated to the constant rated rotation speed $N_{Soll}$ up to the initial storm wind speed $V_{SA}$, at which the installation changes over to storm operation in which the rotation speed is lowered linearly from the rated rotation speed $N_{Soll}$ of the power-optimized mode OM0 down to the spin rotation speed Nt at the switch-off wind speed Vmax.

As explained, the reduced power mode has a lower rated rotation speed $N_{red}$ and a rated wind speed $V_{Rated,red}$ that is also lowered, illustrated in FIG. 4 by the reduced power, unimproved curve 403. Until now, in full-load operation and also in reduced operating mode, the installation has been regulated to its constant rated rotation speed until storm operation was reached. In the reduced operating mode, the reduced rated rotation speed is $N_{red}$. Since the rotation speed has now already been reduced, the installation is accordingly only lowered from wind speeds higher than $V_{SA}$ linearly to the spin rotation speed $N_t$ at the switch-off wind speed $V_{max}$.

It has now been recognized that this procedure has, however, the disadvantage, that when operating at the lowered rated rotation speed $N_{red}$ low tip speed ratios develop, which entail distributions of the angle of attack with high negative angles of attack in the outer region of the rotor blade. Due to possible aero-elastic problems, however, these high negative angles of attack are not desirable, as has now been recognized.

An improved operational control in the full-load range in reduced-power operating modes is therefore proposed, since these high negative angles of attack are avoided, illustrated in FIG. 4 by the reduced-power, improved curve 402. At first, the rotor of the installation turns, as in the reduced power, unimproved curve 402, at the reduced rated rotation speed $N_{red}$. As from a predefined wind speed $V_{SA,red}$, which is smaller than the initial storm wind speed $V_{SA}$, the rotation speed is raised in an arbitrary manner, although preferably linearly, up to another constant rotation speed that is greater than $N_{red}$, preferably to $N_{Soll}$. From then on the characteristic rotation speed-wind speed curve adopts the same curve as in the power-optimized mode OM0 according to the power-optimized curve 401.

The wind speed $V_{SA,red}$ does not, as indicated in the illustration, have to be greater than $V_{Rated,OM0}$, but can also lie below it although in any event is greater than $V_{Rated,red}$. The wind speed $V_{SA,red}$ can be determined in advance through simulations, and depends at least on the installation type and on the reduced rated power. As an alternative it is proposed that oscillations are measured when the installation is operating, and that when threshold values are exceeded the installation is taken to a higher rotation speed. The wind speed $V_{SA,red}$ is in any event not a fixed value, but differs from one installation type to another installation type as a result of the different rotor blade designs.

Figure 5:
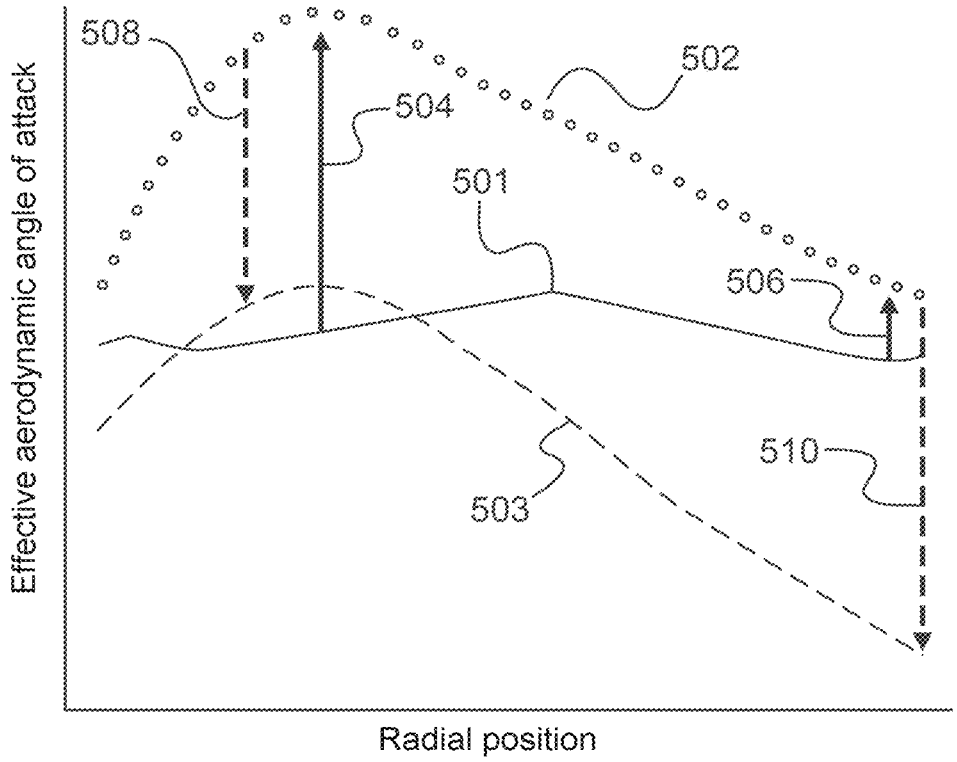
FIG. 5 shows a schematic diagram of effective aerodynamic angle of attack depending on a radial position of the rotor blade for different operating states.

FIG. 5 clarifies why in the prior art an excessively large negative angle of attack can arise in the outer blade region, and why the proposal herein leads to higher angles of attack, that is to fewer negative angles of attack.

Figure 6:
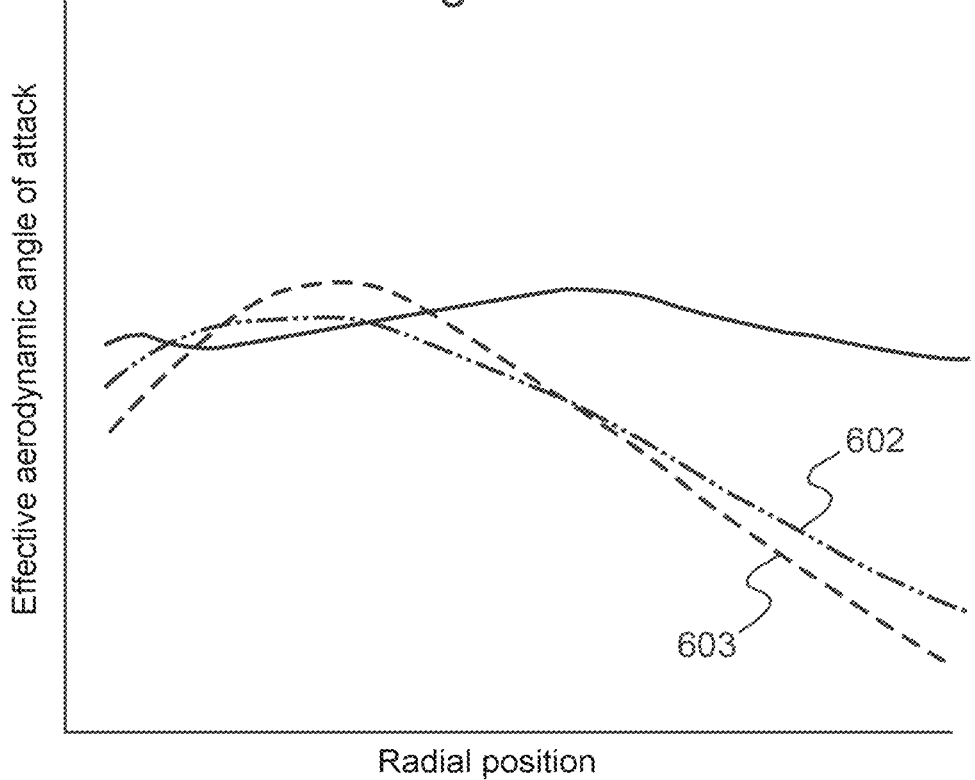
FIG. 6 shows a simplified diagram of effective aerodynamic angles of attack depending on a radial position of the rotor blade for different characteristic operating curves.

At wind speeds above the rated wind speed $V_{Rated}$ the tip speed ratios on the one hand continuously fall, while the blade angles, which can also be referred to as the pitch angles, continuously rise. The fall in the tip speed ratio λ, which is related to the rotation speed n, the blade radius R and the wind speed $v_{wind}$ through the equation $$\lambda = \frac{v_{tip}}{v_{wind}} = \frac{n \cdot \frac{2\pi}{60} \cdot R}{v_{wind}}$$

can easily be seen, since the rotation speed n, and thereby the blade tip speed $v_{tip}$ is constant in the full-load region. The radius R ish derived from the radius of the aerodynamic rotor, and is used in this context as the radius R of the rotor blade, and thus basically refers to the length of the rotor blade plus the remaining distance between the blade root and the axis of rotation. The radial positions of the rotor blade according to the diagrams of FIGS. 5 and 6 are also related to this. The maximum radial position thus corresponds to the blade tip, and the minimum to the rotor blade root.

In any event, the increase in the pitch angle with rising wind speed can equally easily be understood, since the wind power increases with the increasing wind speed, and only a reducing fraction of the energy contained in the incoming flow may be converted into mechanical energy at the rotor shaft in order to achieve the constant rated power. The blades are thus turned correspondingly far out of the wind.

The smaller is the rated power, for example when operating at reduced rated power, the higher are the necessary pitch angles. The effect of the falling tip speed ratio and the rising pitch angle on the angle of attack present at the blade is different, and is to be illustrated with the aid of FIG. 5. The solid line 501 shows a typical angle of attack curve over the blade radius in power-optimized operating mode, which is also referred to as "OM0", in the partial load region.

If the tip speed ratio is now reduced and the pitch angle initially remains largely constant, it can be the case, for example at the transition from the partial load region into the rated load region, i.e., at the transition from partial-load operation to full-load operation, that an angle of attack curve such as is illustrated by the dotted line 502 in FIG. 5 then develops.

The increases in the angle of attack are greatest in the inner region of the blade and fall towards the blade tip, indicated in FIG. 5 through the two solid arrows 504 and 506. If now in rated load operation, which can also be referred to as full-load operation, the pitch angle also increases with rising wind speeds, the dashed angle of attack distribution 503 then develops. An increase in the pitch angle leads to an approximately equivalent fall in the aerodynamic angle of attack, indicated by the dashed arrows 508 and 510.

In particular at high wind speeds and low power take-up by the generator, the situation in which very low tip speed ratios occur in combination with simultaneously large pitch angles then arises at the rotor blade. The consequence of this is a high gradient in the aerodynamic angles of attack over the blade radius, with higher angles of attack in the inner blade region and correspondingly lower angles of attack in the outer blade region, which can have large negative values. Above a predictable combination of wind speed and reduced-power operating mode, the angles of attack even become so low that stalling can occur on the rear side of the rotor blade profile, which is referred to as negative stalling.

It has in particular been recognized that these incoming flow conditions are to be avoided, since remaining in this state can lead to oscillation of the rotor blade and finally to structural damage at the blade. On top of this, this flow state should also be avoided for acoustic reasons, since the stalling can have high sound emissions as a result, and these, due to their frequency spectrum, can also be perceived as even more unpleasant.

FIG. 6 illustrates the proposal herein, or at least part thereof. The proposal namely intends to overcome the problem of the high negative angle of attack in the outer blade region in the operational control of the installation. As already described, negative angles of attack in the outer blade region with high magnitudes are the result of low tip speed ratios with simultaneously high blade pitch angles. If this is compared with the prior art, the proposal of increasing the rotation speed with constant, reduced electric power results in a rise in the tip speed ratios with simultaneous reduction in the pitch angle when states with identical wind speeds are considered. The pitch angle falls because, with an unchanged wind speed and constant rated power, the power coefficient of the installation remains constant. If we consider the characteristic map of the rotor blade, we see that the pitch angle falls at low tip speed ratios as we move along the isoline of the power coefficient in the direction of rising tip speed ratios.

A simultaneous rise in the tip speed ratio and fall in the pitch angle with unchanged installation power then leads, in the proposed new operating mode, to an angle of attack distribution as shown in FIG. 6 by the dash-dot line 602. In comparison with the angle of attack distribution according to the prior art in reduced-power operation, represented by the dashed line 603, we see that the angles of attack in the inner blade region fall, although, as desired, they rise in the outer blade region. Due to the rise in the angle of attack in the outer blade region, the risk of stalling on the rear side of the rotor blade, with the negative effects already explained, is reduced.

Thus, the purpose of avoiding operating states in the operation of the wind power installation in which aeroelastic phenomena lead to rotor blade oscillations that can lead to increased installation stresses is served. Furthermore, the purpose of avoiding greatly increased sound emissions in heavy wind or when the installation is in storm operation is served.

The invention claimed is:

1. A method for operating a wind power installation, comprising:
   operating the wind power installation in a normal operating mode, wherein in the normal operating mode the wind power installation is operated without power reduction, the wind power installation including an aerodynamic rotor operable with a rotation speed that is variable and having a plurality of rotor blades, and the wind power installation being configured to output an output power generated from wind for feeding into an electrical supply grid; and
   operating the wind power installation in a reduced operating mode, wherein in the reduced operating mode the wind power installation is operated at a reduced power, the reduced power being less than a rated power of the wind power installation,
   in a rotation speed increase region, while operating in the reduced operating mode and for wind speeds that increase above a rated wind speed, the wind power installation increases the rotation speed of the aerodynamic rotor and reduces generator torque,
   in the reduced operating mode,
      setting the output power and/or the rotation speed in a partial-load operation depending on a predefined characteristic curve until the output power reaches a value of a reduced specified power;
      as the wind speed continues to rise in a full-load operation, regulating the output power to the value of the reduced specified power and setting the rotation speed depending on the wind speed and a characteristic wind speed-rotation speed curve; and/or
      as the wind speed increases above an initial storm wind speed, setting the output power depending on the wind speed and a characteristic wind speed-power curve and setting the rotation speed depending on the wind speed and the characteristic wind speed-rotation speed curve.

2. The method as claimed in claim 1, wherein:
   depending on the wind speed, the wind power installation is operated in the partial-load operation, the full-load operation, or a storm operation,
   in the partial-load operation, the wind speed is below the rated wind speed so that a maximum power cannot be generated,
   in the full-load operation, the wind speed is equal to or greater than the rated wind speed and below the initial storm wind speed so that the maximum power is reachable,
   in the storm operation the wind speed is equal to or greater than the initial storm wind speed, and power generated is less than the maximum power to protect the wind power installation, and while a wind turbine operates in the reduced operating mode and in the full-load operation, the wind power installation:
holds the rotation speed constant at a reduced rated rotation speed for wind speeds greater than the rated wind speed and up to an escalation wind speed, wherein the escalation wind speed is greater than the rated wind speed and less than the initial storm wind speed.

3. The method as claimed in claim 2, wherein:
increasing the rotation speed in the reduced operating mode comprises increasing the rotation speed above the reduced rated rotation speed and depending on a variable representative of stress on the plurality of rotor blades;
increasing the rotation speed in the reduced operating mode comprises increasing the rotation speed above the reduced rated rotation speed in response to the variable representative of the stress exceeding a stress threshold; and/or
increasing the rotation speed in the reduced operating mode comprises increasing the rotation speed at values above a rated rotation speed.

4. The method as claimed in claim 3, wherein the stress is determined oscillation of at least one rotor blade of the plurality of rotor blades or torsional oscillation.

5. The method as claimed in claim 2, wherein in the reduced operating mode in the full-load operation, the wind power installation, as the wind speed increases further:
increases the rotation speed continuously up to the initial storm wind speed; and/or
increases the rotation speed continuously up to a rated rotation speed.

6. The method as claimed in claim 5, wherein increasing the rotation speed continuously up to the initial storm wind speed is increasing the rotation speed linearly up to the initial storm wind speed.

7. The method as claimed in claim 2, wherein the predefined characteristic curve is a characteristic rotation speed-power curve.

8. The method as claimed in claim 1, wherein:
operating in the normal operating mode is based on a normal characteristic rotation speed curve that depends on the wind speed,
operating in the reduced operating mode is based on a reduced characteristic rotation speed curve that depends on the wind speed,
in the full-load operation, the reduced characteristic rotation speed curve has lower rotation speed values than the normal characteristic rotation speed curve for the same wind speed values up to a unification wind speed, wherein at the unification wind speed the reduced characteristic rotation speed curve and the normal characteristic rotation speed curve intersect,
the reduced characteristic rotation speed curve partially or fully corresponds with the normal characteristic rotation speed curve for wind speeds exceeding the unification wind speed, and/or
the reduced characteristic rotation speed curve has, in at least one section, higher rotation speeds than the normal characteristic rotation speed curve.

9. The method as claimed in claim 8, wherein:
in the reduced operating mode, the rotation speed is lower at the rated wind speed than at the initial storm wind speed, and/or
the unification wind speed corresponds to the initial storm wind speed or is less than the initial storm wind speed.

10. The method as claimed in claim 2, wherein:
before the output power reaches the value of the reduced specified power, a rotation speed curve that depends on the wind speed in the partial-load operation is specified, wherein the rotation speed curve is used in the normal operating mode and in the reduced operating mode,
the reduced rated rotation speed is the rotation speed reached when the output power reaches the value of the reduced specified power, wherein a reduced rated wind speed is less than an installation rated rotation speed and an installation rated wind speed, and
in the reduced operating mode, as the wind speed increases to the escalation wind speed, the plurality of rotor blades are adjusted such that:
the output power is not further increased, and
the rotation speed is held at the reduced rated rotation speed,
wherein the escalation wind speed is greater than the rated wind speed and less than the initial storm wind speed.

11. The method as claimed in claim 10, wherein in the reduced operating mode, as the wind speed increases to the escalation wind speed, the plurality of rotor blades are adjusted such that the output power is held to the value of the reduced specified power, wherein the escalation wind speed is greater than the rated wind speed and less than the initial storm wind speed.

12. The method as claimed in claim 1, wherein when operating in the reduced operating mode, pitch angles of the plurality of rotor blades are reduced.

13. The method as claimed in claim 1, wherein when operating in the reduced operating mode and when wind speeds continue to increase and the rotation of the aerodynamic rotor reaches a rated rotation speed, the wind power installation maintains the aerodynamic rotor at the rated rotation speed.

14. A wind power installation, comprising:
an electric generator configured to generate electric power;
an aerodynamic rotor having a plurality of rotor blades and configured to generate mechanical power from wind for driving the electric generator, wherein the aerodynamic rotor is operated with variable rotor speeds;
an inverter configured to feed output power generated from the wind into an electrical supply grid at a grid connection point; and
a switching apparatus configured to switch operation of the wind power installation between a normal operating mode without a power reduction and a reduced operating mode with the power reduction, wherein:
in the reduced operating mode, a power that is less than a rated power of the wind power installation is set, and
a second controller is configured to control the wind power installation such that:
in a rotation speed increase region, when operating in the reduced operating mode and for wind speeds above a rated wind speed, the rotation speed of the aerodynamic rotor is increased as the wind speed increases, before the output power reaches a value of a reduced specified power and/or up to a reduced rated power, the rotation speed and the output power, in a partial-load operation, are controlled depending on a characteristic rotation speed-power curve in the normal operating mode and the reduced operating mode, the rotation speed and the output power are reduced as the wind speed increases above an initial storm wind speed, a characteristic rotation speed curve that depends on the wind speed is specified for reducing the rotation speed, a characteristic power curve is specified for reducing the output power, and the characteristic rotation speed curve and the characteristic power curve are used for the normal operating mode and the reduced operating mode for wind speeds above the initial storm wind speed.

15. A wind farm, comprising:

a plurality of wind power installations including the wind power installation as claimed in claim 14, wherein the plurality of wind power installations are configured to feed respective output powers into the electrical supply grid at a common grid connection point.

16. The wind farm as claimed in claim 15, comprising:

a central farm controller configured to set respective reduced powers for the plurality of wind power installations depending on an externally-received total power reduction value for the wind farm.

\* \* \* \* \*